United States Patent
Miller et al.

(10) Patent No.: US 7,460,376 B2
(45) Date of Patent: Dec. 2, 2008

(54) ULTRA COMPACT COMPUTER ARRANGEMENT

(75) Inventors: Wayne H. Miller, Los Altos, CA (US); Ricardo Alba Mariano, Hayward, CA (US); Steven Thomas Holmes, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 11/418,210

(22) Filed: May 5, 2006

(65) Prior Publication Data

US 2006/0198112 A1    Sep. 7, 2006

Related U.S. Application Data

(63) Continuation of application No. 10/323,641, filed on Dec. 20, 2002, now Pat. No. 7,042,733, which is a continuation of application No. 09/880,676, filed on Jun. 13, 2001, now Pat. No. 6,545,874.

(51) Int. Cl.
    *H05K 7/02* (2006.01)
(52) U.S. Cl. .................. 361/752; 361/800; 361/790
(58) Field of Classification Search ............. 361/752, 361/790, 797, 800, 709, 711
    See application file for complete search history.

(56) References Cited

U.S. PATENT DOCUMENTS

| | | | |
|---|---|---|---|
| 3,925,710 A | 12/1975 | Ebert | |
| 4,837,663 A * | 6/1989 | Zushi et al. | 361/695 |
| 4,840,225 A | 6/1989 | Foley et al. | |
| 4,851,965 A | 7/1989 | Gabuzda et al. | |
| 4,953,058 A | 8/1990 | Harris | |
| 5,173,819 A | 12/1992 | Takahashi et al. | |
| 5,210,680 A | 5/1993 | Scheibler | |
| 5,398,161 A | 3/1995 | Roy | |
| 5,414,591 A | 5/1995 | Kimura et al. | |
| 5,467,250 A * | 11/1995 | Howard et al. | 361/696 |
| 5,570,740 A | 11/1996 | Flores et al. | |
| 5,673,029 A | 9/1997 | Behl et al. | |
| 5,708,751 A | 1/1998 | Mattei | |
| 5,825,621 A | 10/1998 | Giannatto et al. | |
| 5,828,546 A * | 10/1998 | Tirrell et al. | 361/685 |
| 5,835,349 A * | 11/1998 | Giannatto et al. | 361/701 |
| 6,084,774 A | 7/2000 | Talbot et al. | |
| 6,088,225 A | 7/2000 | Parry et al. | |
| 6,134,107 A | 10/2000 | Kerrigan et al. | |
| 6,157,540 A | 12/2000 | Eddings et al. | |
| 6,185,097 B1 | 2/2001 | Behl | |
| 6,545,874 B1 | 4/2003 | Miller et al. | |
| 6,594,150 B2 * | 7/2003 | Creason et al. | 361/727 |

* cited by examiner

*Primary Examiner*—Hung S Bui
(74) *Attorney, Agent, or Firm*—Buchanan Ingersoll & Rooney PC

(57) ABSTRACT

A cubical computer housing assembly comprises first and second ends and four sides, which define an interior compartment for housing the various computer components. The first and second ends are rigidly connected to one another and are slidingly detachable from four sides of the assembly. The interior compartment comprises three parallelepiped portions, one for accommodating a plurality of circuit boards, one for accommodating a heat sink and hard disk drive, and one for accommodating other memory device such as a CD ROM or DVD player. A hard disk drive is slidingly mounted in a frame which is rigidly mounted relative to the first and second ends. A hinged door on which is mounted a printed circuit board can be moved to an open position to provide access to the disk drive for removal and replacement of same.

20 Claims, 3 Drawing Sheets

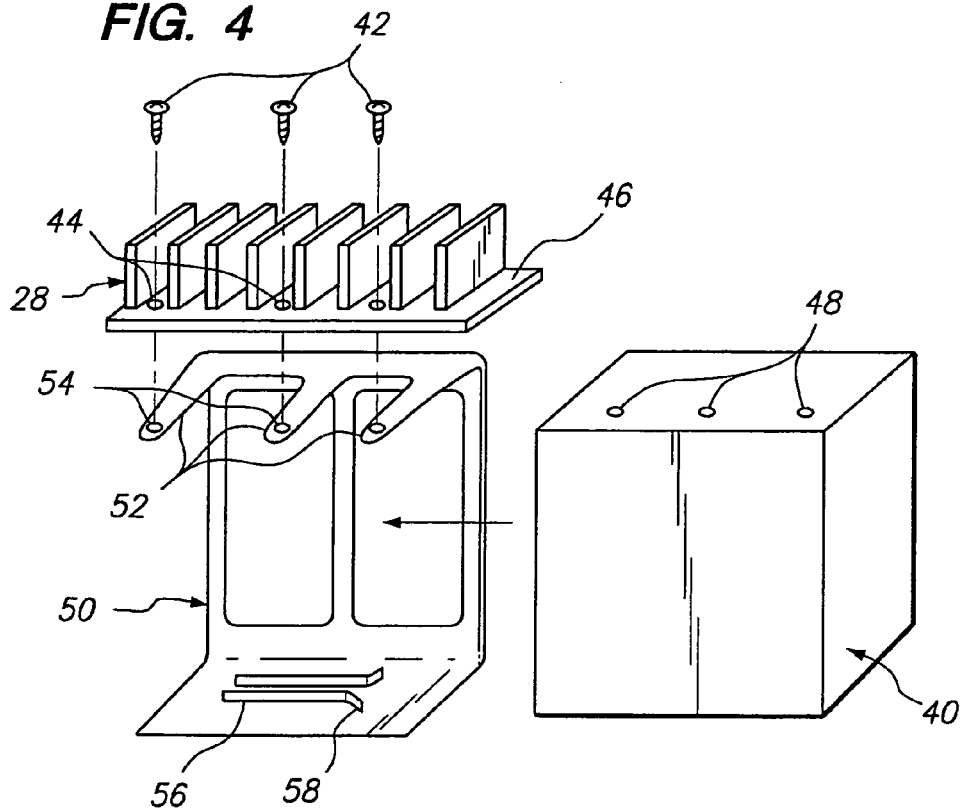
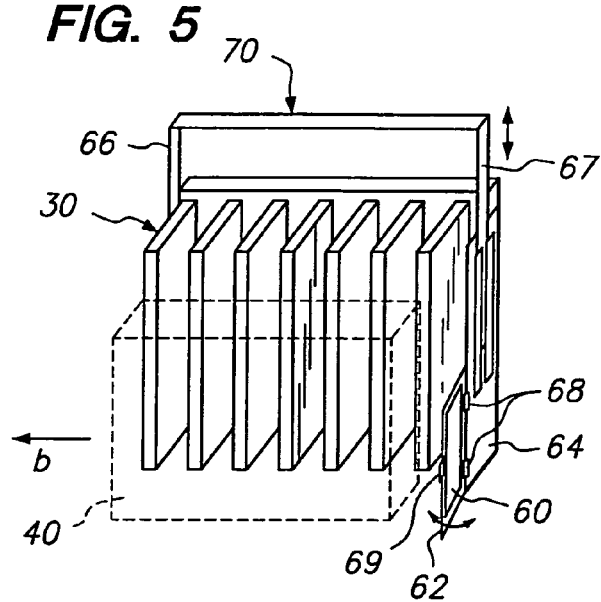

US 7,460,376 B2

ULTRA COMPACT COMPUTER ARRANGEMENT

CROSS-REFERENCE TO RELATED APPLICATIONS

This application is a continuation of and claims priority under 35 U.S.C. § 120 to U.S. patent application Ser. No. 10/323,641, filed on Dec. 20, 2002, now U.S. Pat. No. 7,042,733 which is a continuation of U.S. patent application Ser. No. 09/880,676, filed Jun. 13, 2001 which issued Apr. 8, 2003 as U.S. Pat. No. 6,545,874, the entire contents of which are hereby incorporated by reference.

BACKGROUND OF THE INVENTION

1. Field of the Invention

The present invention relates to computer arrangements, and more particularly, to a compact computer arrangement in which components are disposed within an exterior computer housing with maximized space efficiency while at the same time remaining relatively accessible.

2. Description of Related Art

Conventionally, computer components, such as those of "desktop" computers, are disposed within an exterior housing such that various PC boards (PCBs) are stacked one over the other in a generally horizontal manner within the housing. Depending on the system requirements and specifications, heat generation and EMI (electromagnetic interference) are controlled using for example suitable conductive shields. Further, electric fans are used to dissipate heat from sensitive components. The fans take up valuable space within the housing, increase costs and noise, and are particularly susceptible to failure due to their mechanical nature. The fans and heat sink also complicate the general layout of the components within the housing, hampering access to PCBs that may need to be repaired or replaced, for example during an upgrade of the computer. To resolve these problems, conventional arrangements have relied on a less compact layout, such that components, while taking up more space than necessary, at least remain accessible for purposes of an upgrade for example. Of course, this comes with the expense of increased size and inefficiency.

BRIEF SUMMARY OF THE INVENTION

In accordance with the invention, an arrangement for a computer having a plurality of circuit boards, a heat sink, a hard disk drive, and one or more memory storage devices comprises a housing defining an interior compartment including first, second and third parallelepiped portions. The first, second and third parallelepiped portions accommodate, respectively, the plurality of circuit boards, the heat sink, and the one or more memory storage devices.

Further in accordance with the invention, a desktop computer is provided with a housing having a plurality of sides defining a compartment therein, a frame removably mounted in said compartment, a replaceable computer component slidably mounted to said frame, and a hinged door having an open position and a closed position. In the closed position, the hinged door prevents access to the replaceable computer component, while in the open position the hinged door permits access to the replaceable computer component such that replacement of the replaceable computer component can be effected when the hinged door is in the open position.

Further in accordance with the invention, a desktop computer assembly is provided which comprises a housing having four sides and first and second ends, the first and second ends being rigidly mounted to one another and being slidably detachable from the four sides. A frame which is rigidly mounted relative to the first and second ends is also provided, and a computer component is slidingly mounted in the frame. A door is mounted in a stationary position relative to the first and second ends but is movable between an open position and a closed position, the door in the open position providing access to the computer component such that movable component can be slidingly removed from the frame.

BRIEF DESCRIPTION OF THE SEVERAL VIEWS OF THE DRAWING(S)

Many advantages of the present invention 'null be apparent to those skilled in the art with a reading of this specification in conjunction with the attached drawings, wherein like reference numerals are applied to like elements and wherein:

FIG. 4 is a schematic perspective view of the sliding mounting arrangement of a hard disk drive in accordance with the invention; and FIG. 5 is a schematic perspective view of a hinged door arrangement in accordance with the invention.

DETAILED DESCRIPTION OF THE INVENTION

Figure 1:
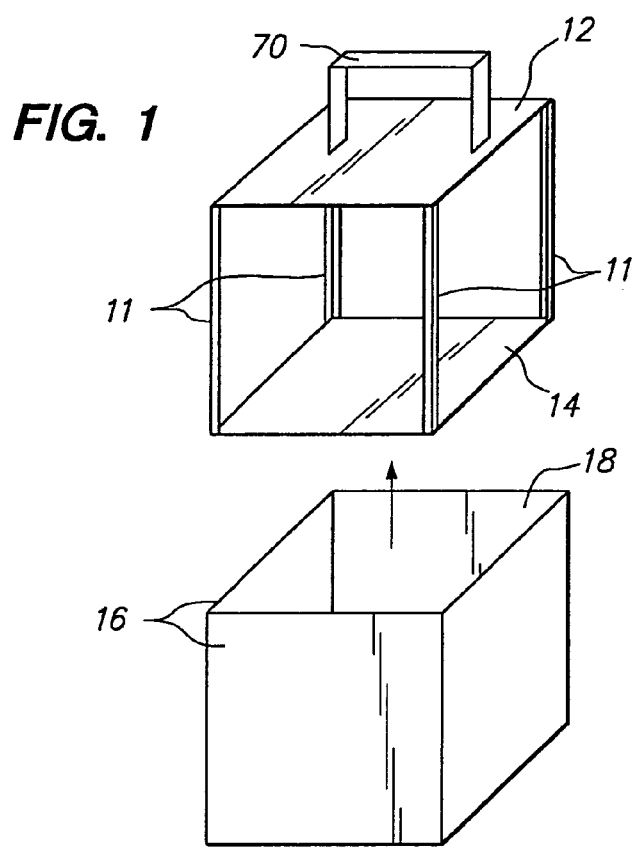
FIG. 1 is a perspective view of the housing in accordance with the invention.

FIG. 1 shows a housing 10 for a computer, for example a desktop computer, in accordance with the invention. Housing 10, which is preferably substantially cubical in shape, has removable first (12) and second (14) ends and four sides 16. The first (12) and second (14) ends and sides 16 serve to define an interior compartment 18 in which various computer components are housed. The first (12) and second (14) ends are rigidly connected to one another, for example by supports 11, and their removal from sides 16 is effected using a retractable handle 70.

Figure 1A:
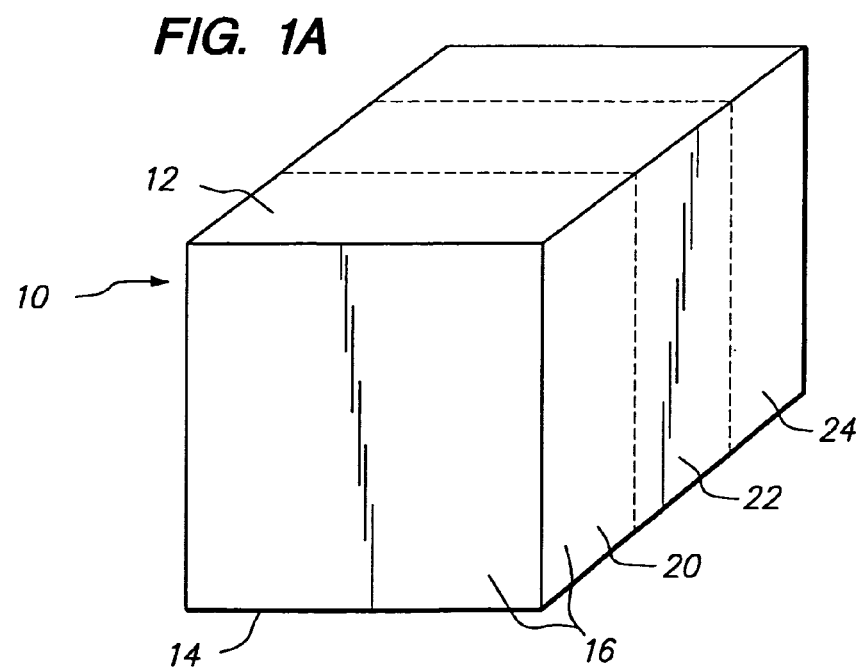
FIG. 1A is a schematic view of the portions of the interior of the housing in accordance with the invention.
Figure 2:
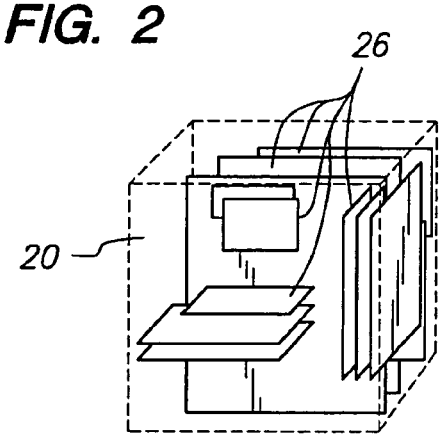
FIG. 2 is a schematic view of a first side portion in accordance with the invention.

As seen from FIG. 1A, compartment 18 can be considered as defining three parallelepiped portions 20, 22 and 24. First side portion 20, shown in FIG. 2, contains the various printed circuit boards 26 of the desktop computer, arranged in a compact configuration, such that some of these PCBs are stacked vertically and in parallel or perpendicular relation to one another, while others are stacked horizontally. Second side portion 24 is dedicated to memory storage devices such as a DVD drive, CD ROM, or a floppy disk drive.

Figure 3:
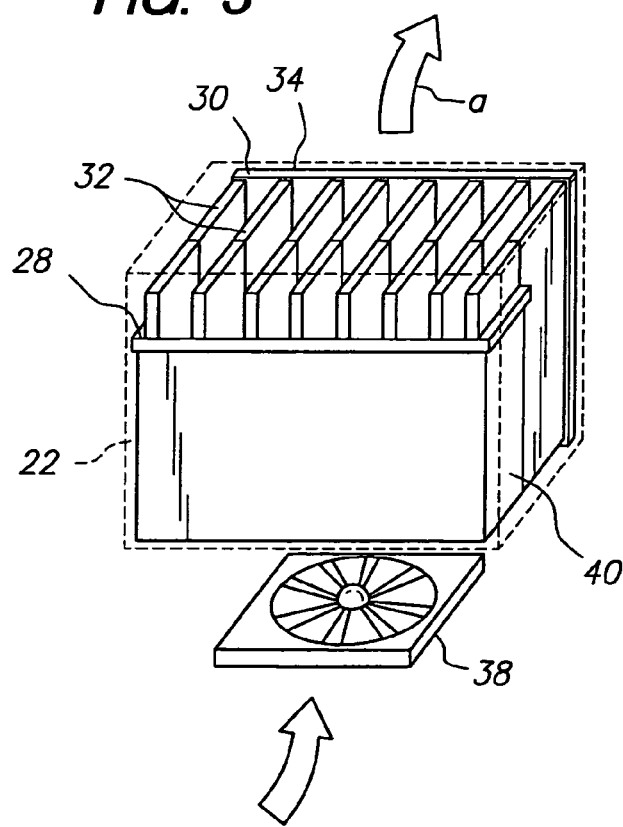
FIG. 3 is a schematic perspective view of a central portion in accordance with the invention.

Central portion 22 is shown in detail in FIG. 3. Central portion 22 is occupied principally by heat sinks 28 and 30 and hard disk drive 40. Heat sink 30 comprises a plurality of vertically extending fins 32 which are supported at one edge by vertically mounted base 34. Fins 32 define slots therebetween which preferably extend the entire height of compartment 18, from first end 12 to second end 14, and thereby form a chimney-type channel through which circulating air (a) can flow in a heat convection cooling process. The ends of this channel substantially coincide with ends of 12 and 14, and to facilitate air flow, ends 12 and 14 can be provided with perforations or other openings (not shown) through which air can enter or exit the channel. Optionally, a fan 38 can be placed along the channel to force air therethrough and create a convection air stream, with the fan preferably being mounted at either one of ends 14 and 16 within compartment 18. Obviously, clearance for such a fan would have to be provided between the end face (14, 16) and the heat sink 30. Heat sink 30 is arranged such that base 34 thereof abuts portion 20 in which the various PCBs are disposed. To exploit its heat dissipation capacity, heat sink 30 is preferably in thermal contact with the computer CPU card layer and a main logic board card layer (not shown) in portion 20, preferably through a heat spreader (not shown) adapted for this purpose.

Heat sink 28 is mounted to hard disk drive 40, for example using fasteners such as screws 42, shown in FIG. 4, which pass through matching holes 44 in base 46 of heat sink 28 to screw into corresponding holes 48 provided in the hard disk drive. This mounting is facilitated by a frame 50, which is provided with extensions 52 having holes 54 formed therein. Holes 54 are in registry with holes 44 and 48. Frame 50 is rigidly supported with respect to the removable first (12) and second (14) ends of computer housing 10. A guide track 56 is provided in frame 50 for mating with a suitable portion such as a rail (not shown) formed on hard disk drive 40 in order to align the hard disk drive in frame 50. Guide track 56 is provided with a flared portion 58 to facilitate entry of the rail of hard disk drive 40 thereinto when the hard disk drive is replaced.

Replacement of hard disk drive 40 is further facilitated using a novel hinged mounting arrangement for components of the computer, and particularly circuit boards, disposed along the side edges of hard disk drive 40. Such a circuit board is PCMCIA card 60, shown in FIG. 5, which is mounted on hinged door 62 having a latch 69 for latching the hinged door in a closed position or for permitting its opening when unlatched such that access to hard disk drive 40 can be gained. PCMCIA card 60 is pluggably mounted in door 62. The hinged mounting of door 62 is with respect to rigid frame 64 to which hinges 68 are secured. Frame 64 is rigidly mounted to removable ends 12 and 14 of housing 10 and supports various components, including heat sink 30 and arms 66 and 67 of retractable handle 70. Arms 66 and 67 pass through suitable openings (not shown) provided in end 12 and are used to gain access to the contents of compartment 18 by pulling ends 12 and 14, along with frame 64 and other supported components (not shown), apart from sides 16. Once these are apart, door latch 69 can be unlatched, permitting opening of door 62 such that hard disk drive 40 can be made to slide in frame 50 for removal thereof in order to service the hard disk drive or replace it in a computer upgrade. The sliding of hard disk drive 40 can be in the direction of door 62. Preferably, however, this sliding is away from door 40, in the direction of arrow b, with the opening of door 62 merely enabling the application of force to the side of hard disk drive 40 so that the hard disk drive can be pushed away from the door and extracted from the other side of the assembly.

The above are exemplary modes of carrying out the invention and are not intended to be limiting. It will be apparent to those of ordinary skill in the art that modifications thereto can be made without departure from the spirit and scope of the invention as set forth in the following claims.

The invention claimed is:

1. A computer having a plurality of components, comprising:
   a housing for accommodating the plurality of components, the housing including a top end and a bottom end defining, respectively, an upper vertical boundary and a lower vertical boundary between the computer and the exterior of the computer; and
   a heat sink comprising a plurality of fins supported by a base, wherein the heat sink defines at least a portion of a vertical path for flow of a convection air stream and disposed within an interior region of said housing, the convection air stream flowing from the bottom end to the top end of the housing,
   wherein two of said components are vertically mounted in the housing of the computer on opposite sides of the vertical flow path and in thermal contact with an exterior surface of the heat sink, and wherein at least two of said vertically mounted components define at least a portion of a vertical path for flow of a convection air stream.

2. The computer of claim 1, wherein at least one of said vertically mounted components is a hard drive, a DVD device or a CD device.

3. The computer of claim 2, wherein a second component is mounted vertically and wherein the second vertically-mounted component is a circuit board.

4. The computer of claim 1, wherein the computer is substantially cubical in shape, wherein the heat sink comprises a plurality of vertically extending fins which are supported at one edge by a vertically mounted base, wherein the fins define slots therebetween and the heat sink extends the entire height of the interior region of the housing.

5. The computer of claim 1, wherein the two vertically-mounted components are slidably mounted and are removable from the computer.

6. The computer of claim 1, further comprising a hinged door and a circuit board mounted to the hinged door, the hinged door having an open position and a closed position, wherein in the open position the vertically-mounted component can be accessed through the hinged door.

7. A computer having a plurality of components, comprising:
   a housing for accommodating the plurality of components, the housing including a top end and a bottom end defining, respectively, an upper vertical boundary and a lower vertical boundary between the computer and the exterior of the computer; and
   a heat sink defining at least a portion of a vertical path for flow of a convection air stream and disposed within an interior region of said housing, the convection air stream flowing from the bottom end to the top end of the housing,
   wherein two of said components are vertically mounted in the housing of the computer on opposite sides of the vertical flow path and in thermal contact with an exterior surface of the heat sink, and wherein at least two of said vertically mounted components define at least a portion of a vertical path for flow of a convection air stream, and
   wherein the computer has four sides in addition to the top and bottom end, wherein the top end and bottom end are rigidly mounted to each other and are slidable relative to the four sides.

8. The computer of claim 7, wherein at least one of said vertically mounted components is a hard drive, a DVD device or a CD device.

9. A desktop computer having a plurality of components, comprising:
   a housing for accommodating the plurality of components, the housing including a top end and a bottom end defining, respectively, an upper vertical boundary and a lower vertical boundary between the computer and the exterior of the computer;
   a plurality of circuit boards within an interior region of said housing in a first region;

one or more memory storage devices within an interior region of said housing in a second region; and a heat sink defining at least a portion of a path for flow of a convection air stream and disposed within an interior region of said housing in a third region between the plurality of circuit boards and the one or more memory storage devices, wherein the computer has four sides in addition to the top and bottom end, wherein the top end and bottom end are rigidly mounted to each other and are slidable relative to the four sides.

10. The desktop computer of claim 9, further comprising:
a vertically mounted hard disk drive, a vertically mounted DVD device, and/or a vertically mounted CD device within an interior region of said housing; and
a hinged door having an open position and a closed position.

11. The desktop computer of claim 9, wherein the at least one of the plurality of circuit boards in the first region is provided in a perpendicular configuration to at least one other of the plurality of circuit boards in the first region.

12. The desktop computer of claim 9, further comprising a frame with a frame heat sink thereon within the second region, wherein the one or more memory storage devices comprises a hard disk drive, and wherein the frame includes a guide track to facilitate sliding the hard disk drive into the frame.

13. A desktop computer having a plurality of components, comprising:
a housing for accommodating the plurality of components, the housing including a top end and a bottom end defining, respectively, an upper vertical boundary and a lower vertical boundary between the computer and the exterior of the computer;
a plurality of circuit boards within an interior region of said housing in a first region;
one or more memory storage devices within an interior region of said housing in a second region; and
a frame with a frame heat sink thereon within the second region, wherein the one or more memory storage devices comprises a vertically mounted hard disk drive, wherein the frame includes a guide track to facilitate sliding the hard disk drive into the frame, and wherein the hard disk drive is in thermal communication with the frame heat sink through thermal conduction of the frame, wherein the computer has four sides in addition to the top and bottom end, wherein the top end and bottom end are rigidly mounted to each other and are slidable relative to the four sides.

14. The desktop computer of claim 13, further comprising:
a vertically mounted DVD device and/or a vertically mounted CD device within an interior region of said housing; and
a hinged door having an open position and a closed position.

15. The desktop computer of claim 13, wherein the at least one of the plurality of circuit boards in the first region is provided in a perpendicular configuration to at least one other of the plurality of circuit boards in the first region.

16. The desktop computer of claim 13, further comprising a third region between the first region and the second region, wherein a fan and a plurality of heat sinks are provided in the third region to dissipate heat from the first region and second region.

17. The desktop computer of claim 16, wherein the plurality of heat sinks in the third region are parallel to the one or more memory storage devices, and the plurality of heat sinks and the one or more memory storage devices are vertically mounted.

18. The desktop computer of claim 16, further comprising a fan in the third region for impelling the convection air stream from air outside the housing of the computer to inside the housing of the computer.

19. The desktop computer of claim 13, wherein the one or more memory storage devices are two or more vertically mounted components.

20. The desktop computer of claim 19, wherein at least one of said two or more vertically mounted components are selected from the group consisting of one or more hard drives, DVD devices, and CD devices.

* * * * *